March 26, 1935. E. V. AMY ET AL 1,995,731
MULTIPLEX RECEIVER SYSTEM
Filed June 19, 1929   2 Sheets-Sheet 1
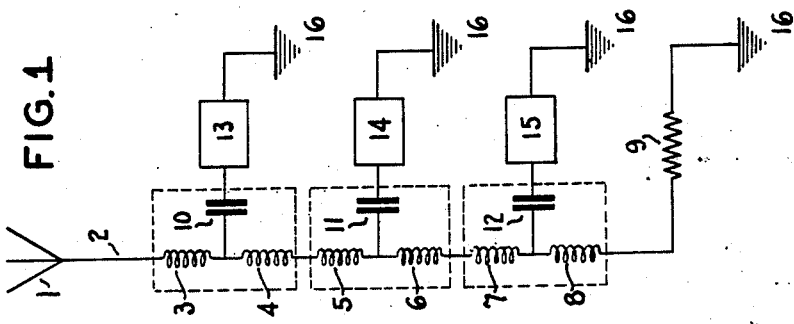
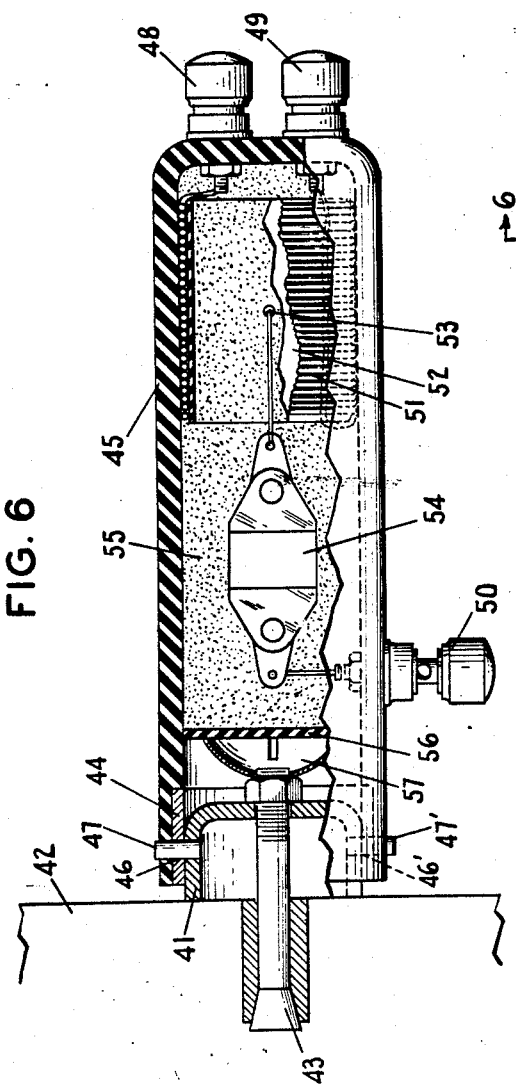
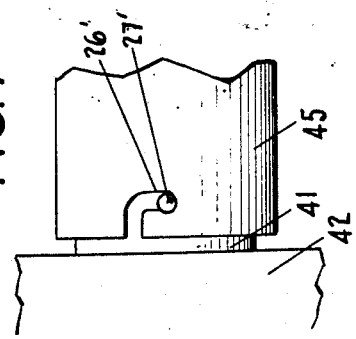
INVENTORS
ERNEST V. AMY AND FRANK KING
BY
ATTORNEY March 26, 1935. E. V. AMY ET AL 1,995,731
MULTIPLEX RECEIVER SYSTEM
Filed June 19, 1929   2 Sheets-Sheet 2

INVENTORS
ERNEST V. AMY AND FRANK KING
BY
Clyde A. Newton
ATTORNEY

Patented Mar. 26, 1935

1,995,731

UNITED STATES PATENT OFFICE 1,995,731

MULTIPLEX RECEIVER SYSTEM

Ernest V. Amy and Frank King, New York, N. Y., assignors to Amy, Aceves & King, Incorporated, New York, N. Y., a corporation of New York Application June 19, 1929, Serial No. 372,177

3 Claims. (Cl. 250—16)

This invention relates to a multiple high frequency receiving system for operating a plurality of high frequency receivers from the same pickup device, such as described in the application of Ernest V. Amy and Julius G. Aceves, filed April 24, 1929, Serial #357,652, assigned to Amy, Aceves & King, Inc., and to which reference is made, and more specifically to an improved form of the coupling and loading units used in such a system.

An object of our invention is to provide a single weatherproof unit combining the loading inductance and coupling capacity, which is economical to manufacture, easy to install, and rugged and reliable in operation.

A further object of our invention is to combine the loading inductance and coupling capacity with an insulator provided with terminals so arranged that the unit may quickly be connected in circuit by an unskilled operator, with minimum possibility of mistake.

A still further object of our invention is to arrange the loading inductances within the units, so that a single unit may serve either as the coupler or as the terminating inductance.

Still another object of our invention is to provide a unitary form of combined loading inductance and coupling capacity which may be quickly attached to the exterior of a building, and easily removed therefrom if desired.

Other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawings, in which:

Figure 1 represents diagrammatically a multiple receiving system according to our invention to which the coupling units having divided loading inductances have been applied.

Figure 5 is an end view of one of the variant forms of our invention.

Figure 6 is a sectional view at the line 6—6 of Figure 5.

Figure 7 is a detail view of the bayonet latch shown in section at the bottom of Figure 6.

Figure 3:
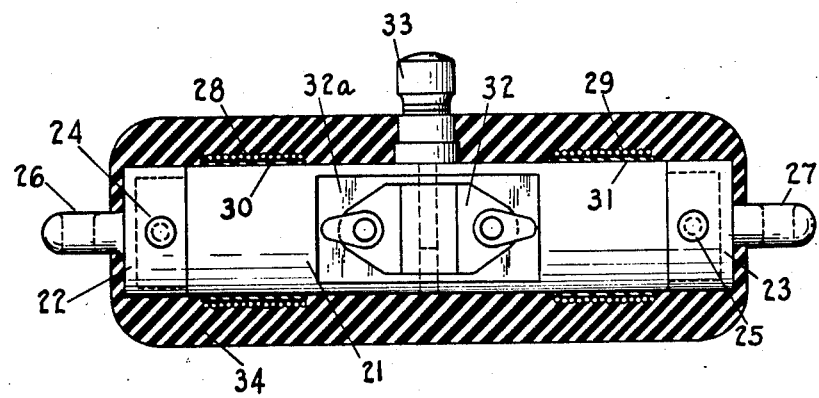
Figure 3 is a sectional view on line 3—3 of Figure 2.

Referring more particularly to Figure 1; three radio receivers designated by the numerals 13, 14, and 15 are each supplied with energy from the antenna 1, by means of the lead-in conductor 2. In order that these receivers may react on each other to as small a degree as possible, we raise the impedance of the lead-in circuit 2 by inserting the loading coils 3, 4, 5, 6, 7, and 8, which are of approximately equal inductance. The receivers are coupled to this loaded line by connecting their respective antenna terminals to condensers 10, 11, and 12. The ground terminals of the receivers are connected to a good ground, such as a water pipe or radiator, herein designated by the numeral 16. In order to prevent reflections which would cause standing waves in the transmission line or lead-in 2, the end of the line is preferably grounded through resistance 9, equal in magnitude to the surge impedance of the line.

The values of inductance and capacity which should be used will depend on the frequency band which the receivers are designed to cover, and should satisfy the equation $$f = \frac{1}{\pi\sqrt{LC}}$$

where $f$ is the highest frequency desired. While we do not desire to limit ourselves to particular constants, we have found that for the present broadcast frequencies, the inductances should have a value of 40 microhenrys, and the capacities should be about 250 m. m. f. For these same conditions the resistance 9 should be about 400 ohms.

The dotted boxes shown in Figure 1 indicate the electrical elements which are combined in the coupling unit hereinafter described, and it will be noted that these units when connected as shown provide terminating coils having half the inductance which is present between receivers. More specifically, coil 3 is the terminating inductance at the antenna end, while coil 8 is the terminating inductance at the ground end. Coils 4 and 5 in series constitute the inductance between receivers 13 and 14, and coils 6 and 7 in series constitute the inductance between receivers 14 and 15. In this way we eliminate the necessity for providing special units containing the termination coils.

The system shown in Figure 1 indicates three receivers, but it will be understood that a greater or less number may be connected in like manner.

Figure 4:
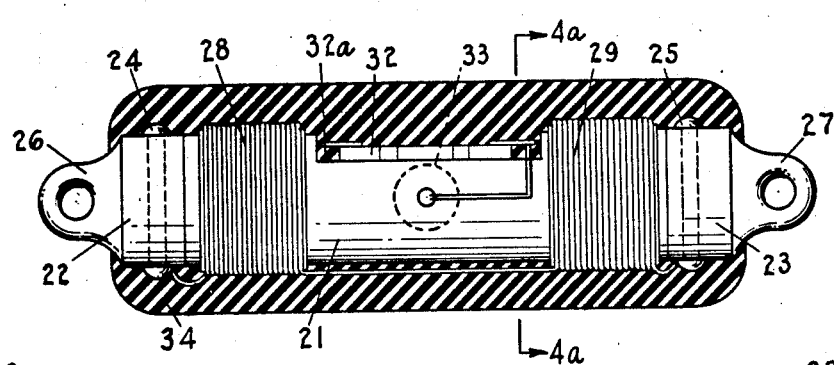
Figure 4 is a sectional view on line 4—4 of Figure 2.
Figure 4A:
Figure 4a is a sectional view on lines 4a—4a of Figure 4.
Figure 2:
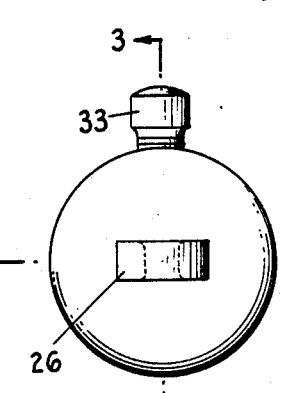
Figure 2 is an end view of a preferred form of our invention.
Figure 4B:
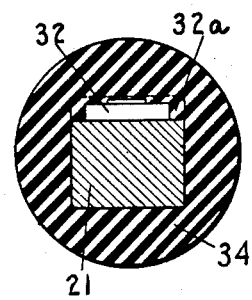
Figure 4b is a similar view of a slightly modified arrangement.

Referring specifically to Figures 2, 3, and 4, these three figures show a preferred form of our invention in which the electrical elements of the coupling units are formed as a single unit, in this case, in the form of a strain insulator which is to be inserted in the lead-in circuit at any point where it is desired to take off a tap for the operation of a receiver. In these figures like numerals designate like parts. A wooden core 21 which may be of round cross section, as in Figures 4 and 4a, or square as in Figure 4b, is provided at each end with the metal lugs 22 and 23, which are secured to it by means of the bolts or rivets 24 and 25, and are provided with eyes 26 and 27 which afford both electrical and mechanical connections for the antenna system. Loading coils 28 and 29 are wound on the insulating tubes 30 and 31, which are then slipped over core 21. Condenser 32 is connected on one side to the wire joining coils 30 and 31, and on the other to the terminal 33, which is mechanically secured to core 21, and the core may be cut away as at 32a to provide a recess for condenser 32. The electrical connections inside the unit are completed by connecting the outer ends of coils 30 and 31 to lugs 22 and 23 respectively. The entire assembly is then enveloped in a suitable moulding compound indicated by the numeral 34 which serves to anchor the electrical elements in place and to protect them from moisture and mechanical injury.

It will be seen that the complete unit is in the form of a weatherproof strain insulator which may be installed in the lead-in wire by cutting it and securing the ends to eyes 26 and 27. The terminal 33 is connected to the antenna terminal of the radio receiver, as shown in Figure 1.

By separating the two coils 28 and 29 the coupling between them is reduced; that is to say, the mutual inductance between two adjacent turns of coil 28 is much greater than that between two turns, one on coil 28 and one on coil 29. Under certain conditions it may be desirable to separate the coils as far as conveniently possible in the construction of the unit.

Where it is desired to operate a number of sets from the same antenna it is only necessary to connect one of these units in the lead-in for each set. As the unit is symmetrical, no error can be made in its connection in the lead-in, provided the antenna binding post is connected to the receiver as described above, thereby insuring correct operation of the system, regardless of the skill of the operator installing it.

In some cases it may be more convenient to build up the coupler in the form of a stand-off insulator which may be attached to some portion of the building. This result may be achieved by using the structure shown in Figures 5, 6, and 7, in which like numerals refer to like parts.

Referring more particularly to Figure 6, the cup shaped metal base 41 is fastened to the building 42 by means of the bolt 43. The metal ring 44 is moulded into the main body of the unit 45, and is provided with bayonet slots 46 and 46' which engage the pins 47 and 47' which are rigidly secured to the base 41. The moulded casing 45 is provided with terminals such as binding posts 48, 49, and 50, and contains at its upper end the coil 51 wound on the insulating tube 52. This coil is center tapped and its mid point 53 is connected to the condenser 54. The other side of condenser 54 is connected to terminal 50. The coil 51 and the condenser 54 are held in place within the casing 45 by means of the insulating compound 55 which fills the casing 45 up to the fiber disc 56. The disc shaped spring washer 57 which is slipped over the end of bolt 43, presses against the fibre disc 56 and thus provides the necessary spring pressure to hold the bayonet catch in engagement.

Electrically this coupling unit is the same as the type first described which was moulded into a strain insulator, and its method of connection is the same, the lead-in wire being cut and connected to the two binding posts 48 and 49, while the antenna post on the radio receiver is connected to the binding post 50.

Should it become necessary for any reason to replace one of these units, such replacement can be effected by disconnecting the three wires connected to the unit, then pressing the unit down slightly and rotating it counter clockwise, which will disengage the bayonet latch and permit the unit to be withdrawn from its base. By a reversal of this process a new unit may be put in service.

While we have shown and described certain preferred embodiments of our invention, it will be understood that modifications and changes may be made without departing from the spirit and scope of our invention, as will be understood by those skilled in the art.

What we claim therefore is:

1. A combined loading and coupling unit for use in multiplex radio systems embodying loading coils interposed in series in the lead-in from the antenna to various receivers, and individual receiver connections through a series condenser to points on said lead-in, separated by loading inductance, said unit comprising, in combination, a housing, a radio frequency loading inductance positioned within said housing, a coupling condenser positioned within said housing, a connection within said housing between one terminal of said coupling condenser and the mid-point of said loading inductance, and connections extending from the outside of said housing to the opposite terminal of said inductance, and a distinctively positioned third connection extending from the outside of said housing to the free terminal of said condenser, whereby said unit may be easily and quickly connected in said lead-in with minimum possibility of incorrect connection.

2. A combined loading and coupling unit for multiplex radio receiving systems embodying loading coils interposed in series in the lead-in from the antenna to various receivers, and individual receiver connections through a series condenser to points on said lead-in separated by loading inductance, such unit comprising, in combination, a housing, a radio frequency loading inductance positioned within said housing and divided into two substantially equal portions connected in series, a coupling condenser positioned within said housing and having one terminal thereof connected to the common point of said portion of said inductance, a pair of non-distinctive connections extending from the exterior of said housing to the free end of said inductance, a third connection extending from the exterior of said housing to the free terminal of said condenser, said condenser connection being easily and quickly distinguishable from said other connections, whereby said unit may be expeditiously connected in said lead-in with minimum possibility of error.

3. A combined loading and coupling unit for multiplex radio receiving systems embodying loading coils interposed in series in the lead-in from the antenna to various receivers, and individual receiver connections through a series condenser to points on said lead-in separated by predetermined values of loading inductance, said unit comprising, in combination, a housing, a radio frequency loading inductance positioned within the housing and divided into two substantially equal portions connected in series, the inductance of each portion being one-half of that predetermined value desired between points of connection of adjacent connected receivers, a coupling condenser positioned within said housing and having one terminal connected to the common point of said portion of said inductance, a pair of non-distinctive connections extending from the exterior of said housing to the free end of said inductance, and a third distinctive connection extending from the exterior of said housing to the free terminal of said condenser, whereby said unit may be easily and quickly connected in said lead-in with minimum possibility of incorrect connecton.

ERNEST V. AMY.
FRANK KING.